March 13, 1934.   R. W. BURNETT   1,950,477
HOLDING AND RETARDING MECHANISM
Filed Sept. 23, 1929   8 Sheets-Sheet 1

Fig. 1

Inventor
Richard W. Burnett
By Barnett & Truman
Attorneys.

March 13, 1934.   R. W. BURNETT   1,950,477
HOLDING AND RETARDING MECHANISM
Filed Sept. 23, 1929   8 Sheets-Sheet 4

March 13, 1934.    R. W. BURNETT    1,950,477
HOLDING AND RETARDING MECHANISM
Filed Sept. 23, 1929    8 Sheets-Sheet 6

Inventor
Richard W. Burnett
By Barnett & Truman
Attorney

March 13, 1934.     R. W. BURNETT     1,950,477
HOLDING AND RETARDING MECHANISM
Filed Sept. 23, 1929     8 Sheets-Sheet 7

Inventor
Richard W. Burnett
Barnett + Truman
Attorneys

March 13, 1934.  R. W. BURNETT  1,950,477
HOLDING AND RETARDING MECHANISM
Filed Sept. 23, 1929  8 Sheets-Sheet 8

Inventor
Richard W. Burnett
By Barnett & Truman
Attorneys

Patented Mar. 13, 1934

1,950,477

UNITED STATES PATENT OFFICE 1,950,477

HOLDING AND RETARDING MECHANISM

Richard W. Burnett, Chicago, Ill.

Application September 23, 1929, Serial No. 394,670

24 Claims. (Cl. 188—81.1)

My invention relates to railway car hand brakes and particularly to improvements in means for holding the hand power mechanism of a railway car hand brake in and releasing it from its brake-setting position.

One of the principal objects of the invention is to provide improved means for releasing the power mechanism of hand brakes from its brake-setting position either instantaneously or by a controlled or retarded release without requiring the brakeman to first operate the power means in a direction to relieve the holding means from the brake setting pressure, and consequently avoid possible injury to the brakeman from the reverse spinning of the power mechanism.

A more specific object of the invention is to provide improved means for releasing the hand power brake mechanism from its fully applied or intermediate positions and for maintaining the reverse movement of said power mechanism under the control of the brakeman. In this connection I provide, as one preferred embodiment, a retarding element separate from the holding means, but which, by movement of a trip lever in a direction to release the brakes, is moved into frictional engagement with a moving part of the hand power mechanism to retard the reverse movement of said power mechanism.

A further specific object is to provide, in combination with holding and releasing means for hand brakes, a retarding means which is so constructed and operated as to insure a substantially uniform bearing upon a relatively large area of a moving part of a hand power brake setting mechanism, and to provide in this connection means for exerting sufficient pressure through the retarding element to control the reverse movement of the brake setting mechanism.

Further objects of the invention will be apparent from the detailed description of the constructions and operations of the embodiments of the invention shown in the accompanying drawings.

In the drawings:

Fig. 3 is a face view of the holding and retarding mechanism shown in Fig. 1 but illustrating the holding member moved out of holding position and the retarding member moved into frictional engagement with a rotating member of the power mechanism.

Figure 1:
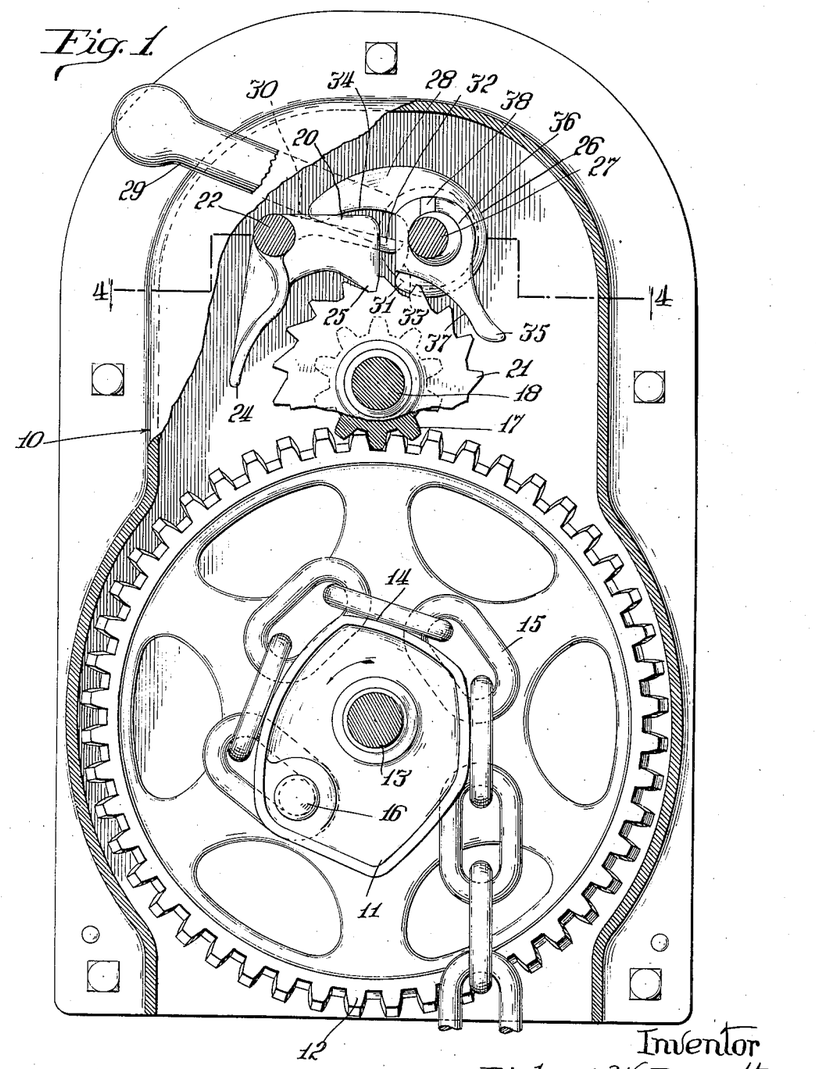
Fig. 1 is a front view of a railway car hand brake power mechanism illustrating holding and releasing mechanism made in accordance with my invention, the outer face of the mechanism housing and parts of the shaft are shown in section, for the purpose of clearness.

Attention is first direction to the embodiment of the invention shown in Figs. 1 to 7 inclusive of the drawings. In this embodiment of the invention the hand brake power mechanism consists of winding mechanism inclosed in a housing 10 adapted to be secured to a side wall of a railway car. The winding mechanism comprises a winding drum 11, a gear 12, preferably formed with a winding drum and revolubly supported on a shaft 13. The winding drum is preferably formed with a grooved winding surface 14 of eccentric contour about which the chain, or other suitable flexible connector 15 is adapted to be wound. The connector 15 is attached to the winding drum by means of a pin 16 and is attached at its other end to mechanism for transmitting the power to the brake rigging underneath the car. The drum 11 is illustrated in Fig. 1 in the position which it assumes when the brakes of a car are fully set. Rotational movement is imparted to the winding drum to set the brakes by means of a pinion 17 meshing with the large gear 12. The pinion 17 is preferably formed integrally with a horizontally disposed shaft 18 which is suitably journaled in the housing 10. One end of the shaft 18 projects out of housing 10 and is provided with a vertically disposed hand wheel 19.

In setting the brakes the brakeman will grasp the hand wheel and rotate it in a clockwise direction with reference to Fig. 1. This movement of the hand wheel imparts rotation to the large gear 12 and the winding drum 11 in a counter clockwise direction with reference to Fig. 1, so as to wind the flexible connector 15 about the winding surface of said drum.

The present invention relates more particularly to the means for holding the winding mechanism above described in its brake setting position and to the mechanism for releasing and controlling the reverse movement of said mechanism when the holding means is disengaged.

Figure 2:
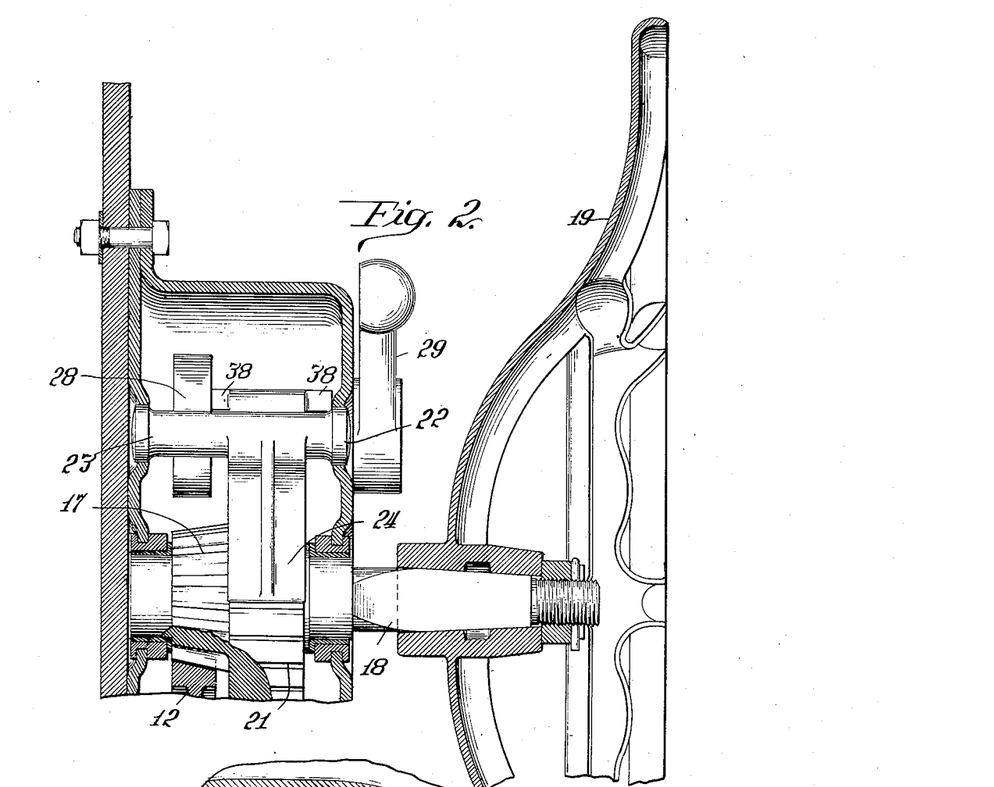
Fig. 2 is a fragmentary cross sectional view of the upper portion of the power mechanism shown in Fig. 1, illustrating the arrangement of my improved holding and retarding mechanism.
Figure 4:
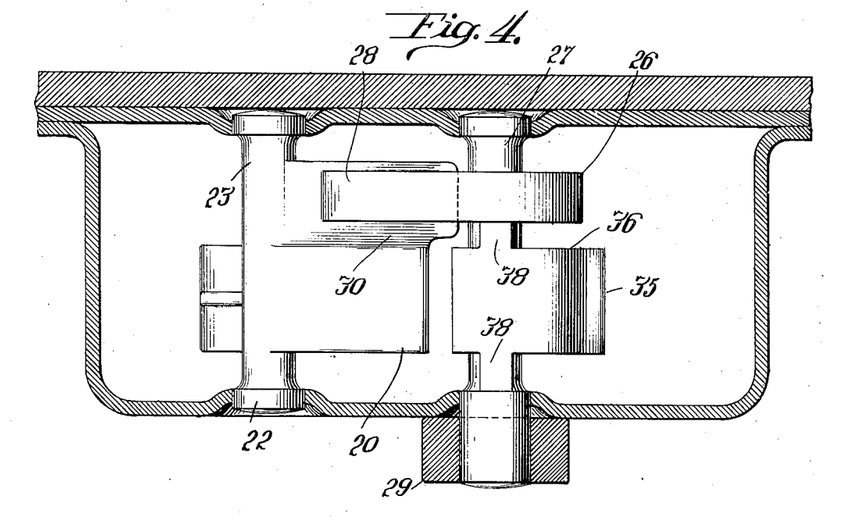
Fig. 4 is a plan view of the mechanism shown in the upper portion of Fig. 1, the housing being broken away and shown in section so as to illustrate more clearly the arrangement of the moving parts of my invention.
Figure 5:
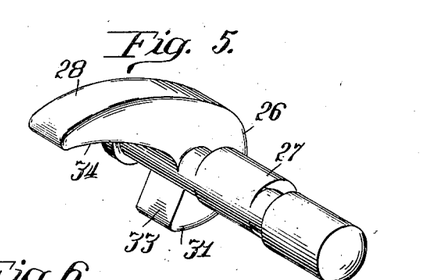
Fig. 5 is a view in perspective of a cam member employed in the embodiment shown in Fig. 1.
Figure 6:
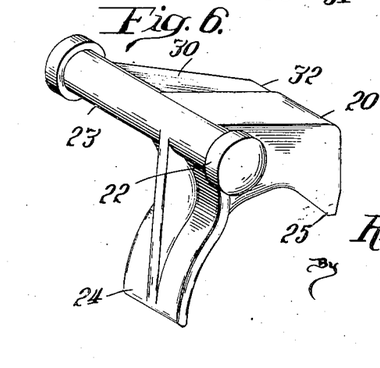
Fig. 6 is a view in perspective of the holding member shown in Fig. 1.
Figure 7:
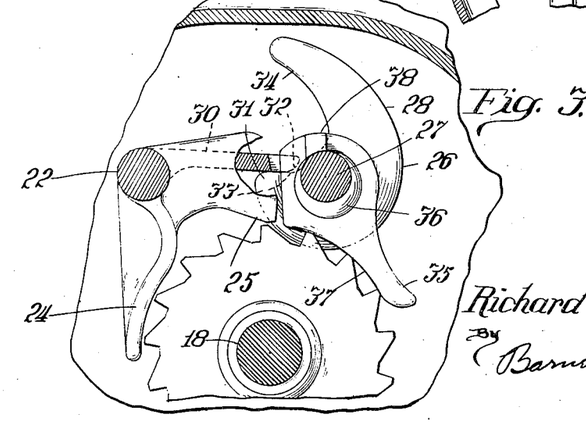
Fig. 7 is a view in perspective of the friction member adapted upon the release of the holding member to move into frictional engagement with a moving part of the pawl mechanism to retard the reverse movement thereof.

The winding mechanism is held against reverse movement by means of a pawl 20 positioned to engage teeth of a ratchet wheel 21, the latter of which is preferably formed integral with the pinion 17 and shaft 18. The pawl 20 is formed preferably with trunnions 22, 23 which are suitably journaled in the upper portion of the housing 10. The tooth end of the pawl is preferably weighted so that it will normally fall by gravity into engagement with the teeth of the ratchet wheel. The pawl is also provided with a tail portion 24 adapted to limit the pivotal movement of the pawl by striking against the teeth of the ratchet gear or other suitable stop device. The tail portion 24 is preferably so positioned relative to the teeth of the ratchet gear that when the tooth end 25 of the pawl is disengaged from the teeth of the ratchet the inner surface of the tail 24 will assume a position relatively close to the ratchet teeth as shown in Fig. 3 so as to prevent overthrow of the pawl when the tooth end is ratcheting over the teeth of the ratchet wheel. The tooth end of the pawl 20 is preferably lifted out of its holding position by means of a cam member 26 fixed to a shaft 27 and adapted to be rotated from one position to another by means of a trip lever 29 secured to the shaft 27 and positioned between the hand wheel 19 and the outer face of the housing 10 as shown in Fig. 2 of the drawings. The cam member 26 is formed preferably with a long jaw 28 adapted in one position of the lever 29 to bear down upon a flange 30 extending outwardly from one side of the pawl 20. Preferably the arm 28 is of such length that it will bear down on the pawl at a point near the pivotal axis of the pawl so that, the ratcheting movement of the pawl over the teeth of the ratchet gear will not impart objectionable oscillation to the trip lever 29 during the brake setting operation. The cam member 26 is also formed with a short cam member or arm 31 positioned to engage the under surface of the lateral flange 30 of the pawl at a point near the outer end of the pawl so that when the lever 29 is moved from the position shown in Fig. 1 to the position shown in Fig. 3 compound leverage can be exerted to lift the tooth end 25 of the pawl out of its holding position. The end portion 32 of the lateral flange 30 is preferably curved so as to provide a rounded bearing surface for engagement with the surface 33 of the short cam 31. The under surface 34 of the long arm 28 is preferably curved upwardly so as to provide suitable clearance between said under surface of the arm and the upper surface of the lateral flange 30 and thereby avoid engagement of said flange with said under surface of the arm during the pivotal movement of the pawl. Preferably the distance between the long arm 28 and the short arm 31 of the tripping cam member is such that the said arm embraces the end portion of the flange 30 of the pawl and, due to the position of the tail 24 of the pawl, is limited in its pivotal action in a direction to disengage the pawl to a position slightly past the vertical passing through the axis of the shaft 27. This position of the tripping lever makes it possible to exert greater force on the lever than when it is thrown to a greater degree across the vertical center of the shaft 27. It will be seen from the foregoing description that when the lever 29 is in the position indicated in Fig. 1 the weight of the lever serves as additional weight to maintain the holding pawl 20 in its holding position. That is to say, in a position to prevent movement of the brake winding mechanism in the direction to release the braking pressure and that in moving the trip lever 28 from the position shown in Fig. 1 to the position shown in Fig. 3, the short cam 31 is brought into engagement with the end portion of the pawl 30 to lift its tooth end 25 out of engagement with the ratchet teeth and consequently permit the winding mechanism to move in a reverse direction. In order to avoid violent spinning of the hand wheel when the brakes are released from their fully set position and to also provide means whereby the braking pressure can be controlled to effect a graduated release of the brakes without requiring the brakeman to grasp the hand wheel, I provide a retarding member 35 adapted to be pressed against a moving part of the winding mechanism, preferably, though not necessarily, the teeth of the ratchet wheel, when the trip lever 28 is moved to a position to disengage the holding pawl from the ratchet. The retarding member 35 is preferably in the form of a shoe pivotally supported on an eccentric portion 36 of the shaft 27. The loose pivotal connection of the shoe with the eccentric portion 36 of the shaft makes it possible to bring the curved under surface 37 of the shoe flat against the periphery of the ratchet gear and thereby insure engagement with a relatively large frictional surface and avoid wear at one part of the shoe, such as would be the case if the shoe were supported on a fixed pivot. Furthermore the pivotal arrangement of the shoe together with the eccentric shaft 36 insures a perfect fit of the friction surface 37 against the ratchet teeth without requiring the said surface 37 to be machined. The eccentric construction of the shaft 27, in addition to insuring a uniform bearing of the surface 37 against the ratchet provides for the exertion of great frictional force against said ratchet by a continued swinging motion of the tripping lever in a direction to disengage the pawl 20 from said ratchet. The hub portion of the retarding shoe is formed with spacing lugs 38—38 which hold the friction shoe in a position to bear against the ratchet teeth. The portion of the hub of the shoe adjacent the end of the pawl 20 is preferably cut away to provide sufficient space for the rocking movement of the pawl. The position of the said shoe relative to the tooth end of the pawl together with the curved surface 37 is such as to prevent any undesirable displacement of the retarding shoe. The arrangement and proportions of the various elements of the holding and releasing mechanism are such that when the tooth 25 of the pawl 27 is disengaged from the teeth of the ratchet 21 further swinging movement of the tripping lever 28 will move the friction surface 37 of the retarding shoe into frictional engagement with the teeth of the ratchet gear. This pressure of the shoe against the ratchet gear may be varied by the manipulation of the trip lever 28.

Figure 8:
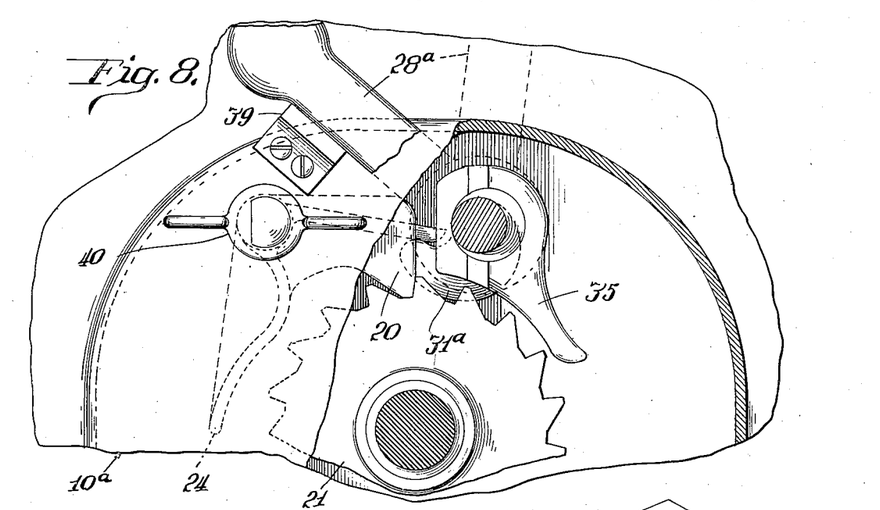
Fig. 8 is a fragmentary front view of a modified construction showing the relative positions of the trip lever holding member and retarder when the holding member is in its holding position.
Figures 9, 10:
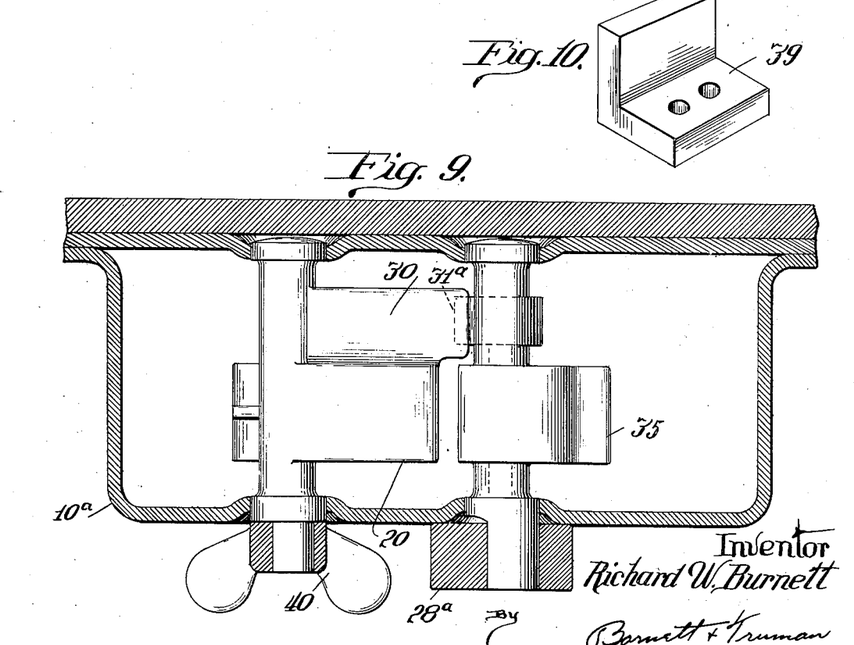
Fig. 9 is a plan view of the construction shown in Fig. 8.
Fig. 10 is a view in perspective of a stop member for supporting the trip lever in the position shown in Fig. 8.

In the modified construction shown in Figs. 8, 9 and 10 the holding pawl is maintained in its holding position by means of its own weight.

In Figs. 8 and 9 the ratchet, the holding pawl 20 and the retarding shoe 35 are preferably identical in construction with the corresponding elements of the previous embodiment. The tripping lever of the present modification however consists only of a short cam member 31ª employed for disengaging the tooth end of the pawl 20 from its holding position. A tripping lever 28ª is supported in its normal position illustrated in Fig. 8 by means of a suitable stop 39 secured to the outer face of the housing 10ª. In this modification the end of the pawl 20 is disengaged from the teeth of the ratchet gear by movement of the trip lever 28ª to the dotted line position in the same manner as that previously described in connection with the embodiment shown in Figs. 1 to 7 inclusive. If for any reason it is desirable to support the holding pawl 20 out of engagement with the ratchet teeth this may be accomplished by manual rotation in the winged operating member 40 in the appropriate direction. The winged member 40 also provides for manually returning the holding pawl to its holding position in the event that it should for any reason fail to drop by gravity.

Figure 11:
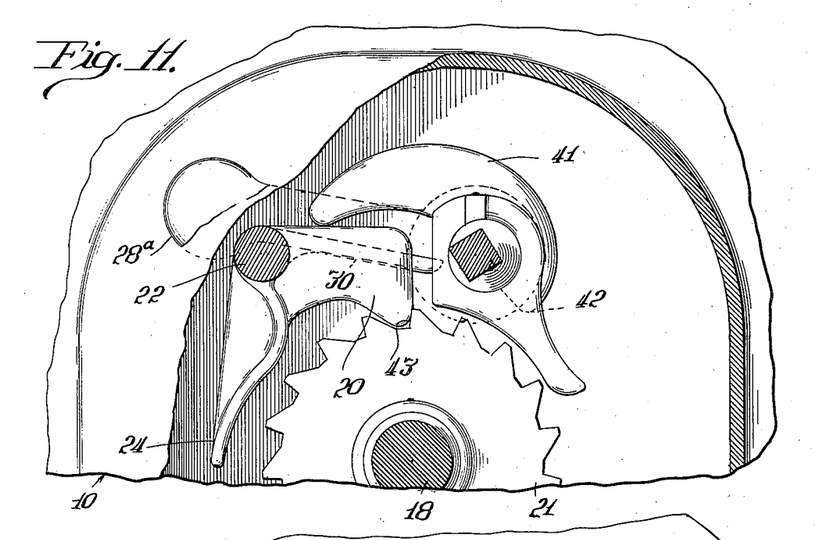
Fig. 11 is a fragmentary view illustrating a further modified construction of the holding and releasing means whereby the tripping lever may be employed to hold the holding pawl either in or out of its engagement with the ratchet gear; the weight of the lever being utilized in this figure to hold the pawl in engagement with the ratchet gear.
Figure 12:
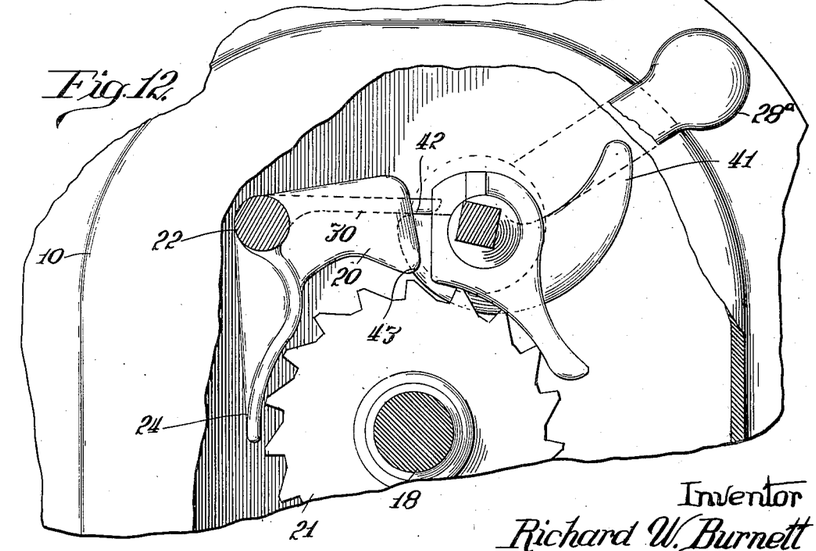
Fig. 12 is a view of the construction of Fig. 11 illustrating the parts in the relative position shown in Fig. 3.

In the modification shown in Figs. 11 and 12 I have illustrated the holding and retarding mechanism of the type shown in Fig. 1, but have illustrated a somewhat greater spread between the long and short arms 41, 42 of the tripping cam member so that when the tripping lever 28ª is moved to its tripping position, that is to say to the position indicated in Fig. 12, the weight of the lever will serve to support the holding pawl out of engagement with the ratchet teeth thereby permitting the brakeman to manipulate the hand wheel in either direction to effect a graduated release. This character of operation may be required when the brakeman for any reason has failed to sufficiently check the speed of the gliding car before it reaches its intended position. For example in shifting cars in a "hump yard" to various tracks the brakeman may misjudge the speed of the car and in order to insure proper gliding of the car as it approaches cars standing on the tracks, the brakeman may desire to increase the braking pressure and then release the same by manipulating the hand wheel only.

The position and operation of the retarding member shown in each of the several embodiments not only permit the brakeman to control the reverse spinning of the winding mechanism but make it possible also for the brakeman to relieve the operating mechanism of the severe shocks during the step by step release, that is to say by a release effected by releasing the holding pawl and permitting its reengagement with the ratchet gear during the reverse spinning movement of the winding mechanism. In accordance with the present invention the step by step release may be effected with less shock to the pawl and ratchet teeth by merely checking the speed of the reverse movement of the ratchet before the pawl is permitted to reengage the ratchet teeth. The above result can be obtained in either of two ways, with the embodiment shown in Figs. 11 and 12. In the first case the reverse movement of the ratchet gear can be checked by applying retarding pressure thereto through the retarding member whereupon the tooth may again reengage the ratchet gear before the gear acquires a reverse spinning movement of sufficient velocity to injure the pawl or the teeth of the ratchet. In the event that the pawl is released from the position shown in Fig. 12 so as to permit the tooth end of the pawl to reengage the ratchet, the rounded end 43 of the pawl tooth will be engaged by the reverse spinning ratchet teeth and thereby thrown upwardly out of engagement with the teeth until the velocity of the reverse movement of the ratchet gear has so decreased as to permit the tooth of the pawl to drop into its holding position. While I have illustrated herein the rounded tooth end of the pawl in connection with a retarding shoe, it will be obvious that the rounded end of the pawl may be employed, if desired, without the cooperation of the retarding shoe member.

Figure 13:
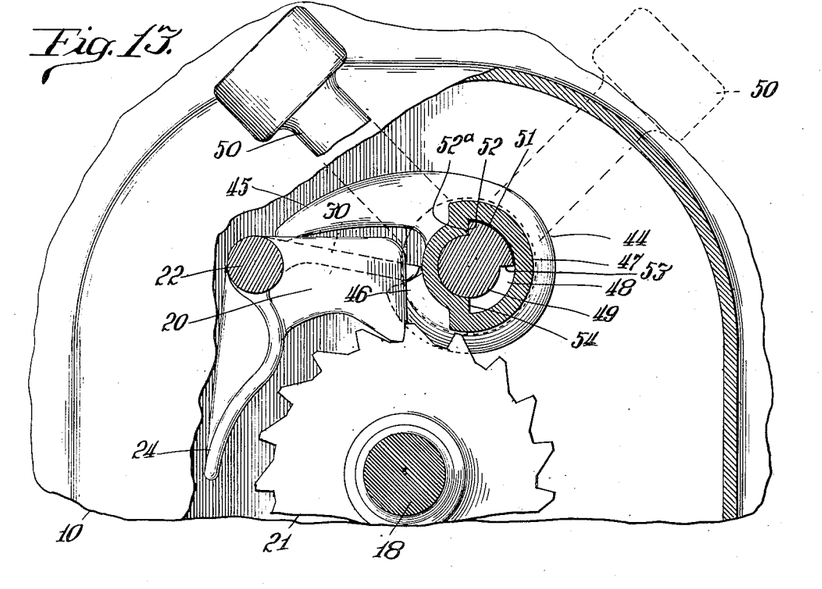
Fig. 13 is a fragmentary face view of the holding and releasing mechanism so modified that the tripping lever has a lost motion connection with the tripping cam member.
Figure 14:
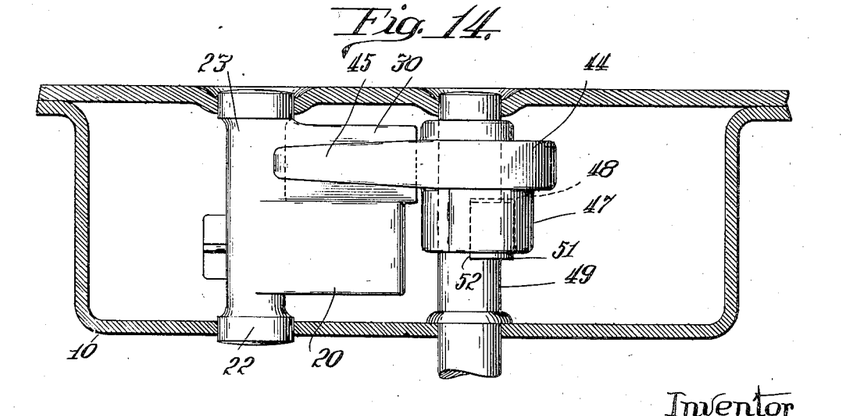
Fig. 14 is a plan view of the mechanism shown in Fig. 13, the housing of the mechanism being shown in section for the purpose of clearness.
Figure 15:
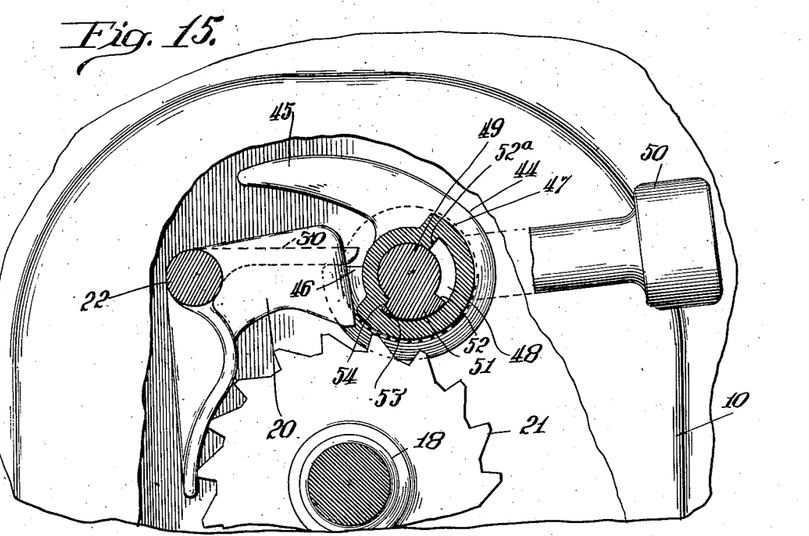
Fig. 15 is a view similar to Fig. 14, illustrating the tripping lever and tripping cam in a position to support the holding pawl out of engagement with the ratchet member.

In Figs. 13 and 14 the modified construction illustrates how the relatively large throw of the tripping lever may be had without increasing the spread between the jaws of the tripping member. In this embodiment the tripping cam or rocking member 44 is formed with a long arm 45 and a shorter arm 46 which correspond substantially to the long arm 28 and short arm 31 of Fig. 1 of the drawings except that with the present construction the long and short arm 45—46 may be made somewhat closer together. One side of the cam tripping member is formed with a hub 47 having a recess 48. The shaft 49 on which the trip lever 50 is secured is formed with a lug 51 adapted to extend into the recess 48. The lug 51 is so formed that when the lever 50 is in one position, for example the position shown in Fig. 13, the face 52 of the lug will bear against the shoulder of the recess 48 so as to hold the long arm 45 of the trip lever down in the pawl 20 and when the lever 50 is moved to another position, for example the position shown in Fig. 15, the shoulder 53 of the lug will bear against the shoulder 54 of the recess so as to force the small arm 46 of the cam tripping member into engagement with the under surface of the pawl to lift it out of engagement with the ratchet gear 21. Preferably the shoulders 52 and 53 of the lug 51 are so proportioned relative to the length of the recess 48 that the shoulder 53 is brought into engagement with the shoulder 54 when the tripping lever 50 reaches substantially the position indicated by dotted lines in Fig. 13. In this position of the lever 50 the operator can apply maximum power to lift the holding pawl out of the holding engagement with the ratchet, or if desired the pressure on the pawl 20 may be relieved by a tightening movement of the hand wheel whereupon the weight of the trip lever 50 will force the tooth end of the pawl upwardly and support it out of engagement with the ratchet 21. In the modification shown in Figs. 13, 14 and 15, I have not illustrated the use of the retarding shoe but such member may obviously be applied along the lines of the previous modifications.

Figure 16:
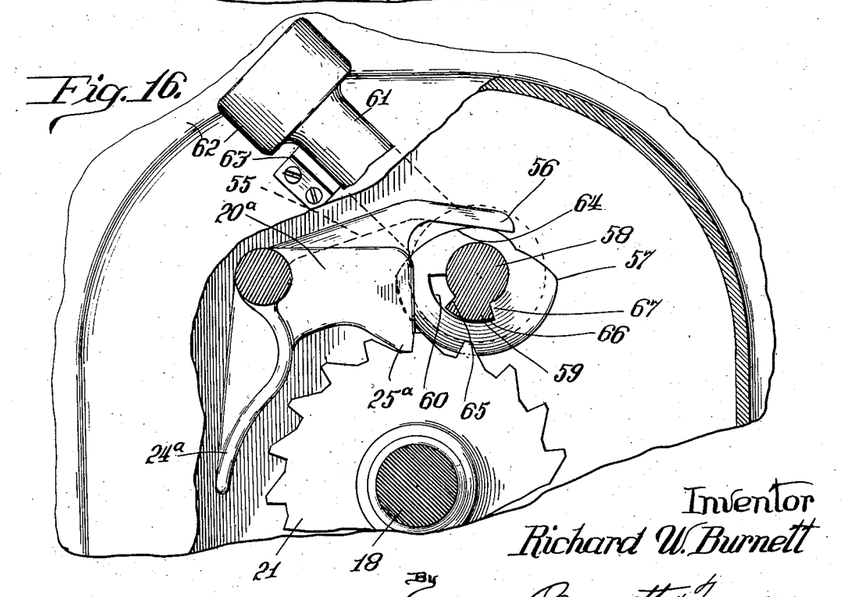
Fig. 16 is another modification of the holding and releasing mechanism in which a cam is employed for raising the pawl out of engagement and in which a lever having a lost motion connection with the cam is employed for moving the cam from one position to another.
Figure 17:
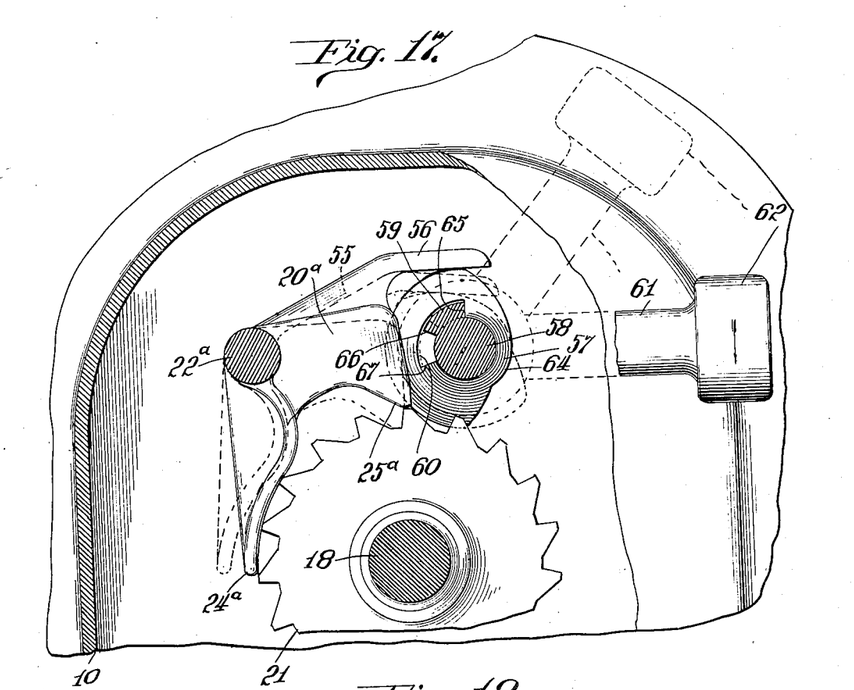
Fig. 17 is a view similar to Fig. 16 but illustrating another position of the parts.
Figure 18:
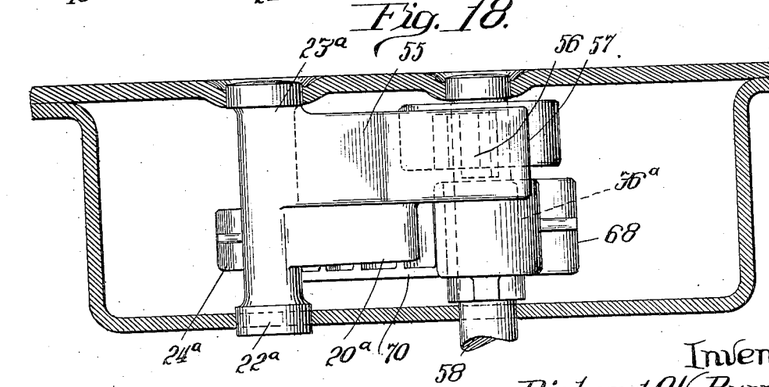
Fig. 18 is a plan view of the holding and releasing mechanism shown in Fig. 17, the upper portion of the housing being shown in cross section.

In Figs. 16, 17 and 18 a tripping mechanism is illustrated in which the holding pawl, when it is supported out of holding position, cannot be again reengaged with the teeth of the ratchet until the tripping lever has been moved a substantial distance in a counter clockwise direction with reference to Fig. 17. In this embodiment the ratchet gear 21 is held from reverse movement by means of a pivoted pawl 20ª, one end of which is weighted so that the tooth portion 25ª will normally drop by gravity into engagement with the teeth of the ratchet gear 21. The other end of the pawl is formed with a tail-piece 24ª adapted to engage the teeth of the ratchet wheel 21 or other portion of the pawl mechanism to limit the upward movement of the tooth end 25ª. The tail end 24, bearing against a moving part of the power mechanism may also serve as a retarding member as will hereinafter be apparent. The pawl 20ª is formed with a laterally disposed flange 55. It preferably extends upwardly from the pivotal axis of the pawl toward the tooth end thereof and then turns down at an obtuse angle to form an end portion 56 which extends preferably beyond the end of the pawl. A tripping cam 57 is loosely supported on the trip shaft 58, the latter of which is formed with a lug 59 which projects into a recess 60 formed in the cam member 57. The trip lever 61 is of the same construction as the lever shown in Fig. 13 and is provided at its outer end with a weighted portion 62 and is normally supported in the position indicated in Fig. 16 by an outwardly projecting bracket 63 secured to the front face of the mechanism housing. The length of the recess 60 is preferably such with relation to the size of the lug 59 that the tripping lever 61 and trip shaft 58 may be moved through a predetermined arc without imparting movement to the cam member 57. Preferably the cam 57 is formed with a surface 64 defined by a gradually increasing radius and is normally supported in the position indicated in Fig. 16 by reason of its frictional contact with the end portion 56 of the pawl 20ª, this frictional engagement being sufficient to permit the lost motion movement of the lever above referred to. The downwardly inclined end portion 56 of the pawl bears preferably at a point substantially on the vertical axis of the trip shaft 58 for substantially the full operating movement of the cam. When it is desired to disengage the tooth 25 of the pawl from its engagement with the ratchet 21, the lever 61 is moved toward the position indicated in Fig. 17. Preferably the length of the recess 60 is such that the shoulder 65 will not come into engagement with the end 66 of the recess until the trip lever 61 has passed the perpendicular position whereby further movement of the lever will impart a rotary motion to the cam 57 and lift the tooth 25ª of the pawl out of its holding position. The curvature of the cam surface 64 is such that the tooth 25ª of the pawl begins to rise out of engagement with the ratchet teeth but that complete disengagement of the said tooth 25ª is not effected until the weighted end of the trip lever 61 reaches approximately the position indicated in full lines in Fig. 17. A lost motion connection between the trip lever and the cam permits the lever to be moved to a position most advantageous for applying maximum power to the brakes and at the same time permit the weighted end of the trip lever to act automatically upon the cam to rotate it when the braking pressure on the pawl is relieved by movement of the hand wheel in a direction to tighten the brake. The frictional contact between the cam 57 and the projection 56 of the pawl is such that the cam will be maintained in the position indicated in Fig. 17 to support the pawl tooth out of engagement with the ratchet until the tripping lever 61 is moved in a counter clockwise direction to such a position that the shoulder 66 of the lug 59 will engage the end 67 of the recess 60. This embodiment of the invention also includes means for retarding the reverse movement of the ratchet gear either by forcing the tail end 44 into engagement with a moving part of the pawl mechanism or by the separately provided retarding shoe 68 which bears upon the teeth of the ratchet. The shoe member 68 may be and preferably is identical with the shoe 35 of Fig. 1 and is moved into and out of frictional engagement with the ratchet gear by means of an eccentric portion 36ª of the trip shaft 58. The retarding shoe 68, it will be seen, is forced into frictional engagement with the ratchet gear as soon as the tooth 25ª of the pawl is disengaged from the ratchet gear. This pressure may be varied either to hold the ratchet gear from reverse movement or to permit reverse movement thereof under the control of the operator. If it is desired to use the tail portion 24ª of the pawl as a retarding member, this can be done readily by varying the curvature of the cam 57 as shown in Fig. 17 so that the tail portion 24ª will be brought into engagement with the teeth of the ratchet gear after the tooth 25ª is disengaged therefrom but before the lever 61 reaches the limit of its movement.

In Fig. 18 I have shown how the ratchet wheel 21 may be increased in width to provide a smooth rim 70 on which the curved surface of the retarder bears in addition to its bearing on the edge of the ratchet teeth.

While I have described the construction and operation of my invention in connection with several specific embodiments, I do not wish to be limited to the specific constructions shown and described except insofar as the state of the art may require or express limitations appear in the claims.

I do not claim specifically herein the curved tooth pawl shown in Figs. 11 and 12 or the combination of said specific form of pawl with the other elements of the brake mechanism since this subject matter forms the basis of my copending divisional application Serial No. 592,371, filed February 11, 1932.

I claim:

1. In hand brakes for railway cars, the combination with hand power mechanism operable in one direction to set the brakes and a holding pawl for holding the said power mechanism in set position, of means for releasing said holding pawl and for controlling reverse movement of the power mechanism comprising a friction member for engagement with a moving part of said power mechanism, and hand operated mechanism separate from the pawl for forcing said pawl out of its holding position and for moving said friction member into and out of frictional engagement with said moving part of the power mechanism.

2. In hand brakes for railway cars, the combination with hand power mechanism operable in one direction to set the brakes, of means for holding the power mechanism in and releasing it from its brake setting position, comprising a pawl pivoted to engage a movable part of the power mechanism, a tripping cam, a hand lever for imparting tripping movement to said cam, a retarding member pivotally supported for frictional engagement with a moving part of the power mechanism, and means whereby movement of said tripping lever in a direction to release the holding means moves said retarder member bodily toward the said moving part of the power mechanism.

3. In hand brakes for railway cars, the combination with hand power mechanism operable in one direction to set the brakes, of means for holding the power mechanism in and releasing it from its brake setting position, comprising a pawl pivoted to engage a movable part of the power mechanism, a cam member for lifting said pawl out of its holding position, a lever for imparting movement to said cam, a retarding member pivotally supported for frictional engagement with a moving part of the power mechanism, and means operable by the movement of said lever in a direction to release said pawl to move the pivotal axis of said retarder member toward said moving part of the power mechanism.

4. In hand brakes for railway cars, the combination with hand power mechanism operable in one direction to set the brakes, of means for holding the power mechanism in and releasing it from its brake setting position, comprising a pawl pivoted to engage a movable part of said power mechanism, a tripping cam, a hand lever for imparting movement thereto to release said pawl from its holding position, a retarding member pivotally supported for frictional engagement with a moving part of the power mechanism, and means providing a pivotal axis for said retarder eccentric to the axis of said tripping cam and operable simultaneously therewith to move said retarder into its retarding position during movement of the cam to its pawl releasing position.

5. In hand brakes for railway cars, the combination with winding mechanism operable in one direction to set the brakes, of mechanism for holding the winding mechanism in and releasing it from its brake setting position, comprising a ratchet operable with the winding mechanism, a holding pawl for engagement with said ratchet, a tripping cam member operable about an axis remote from the pivotal axis of said pawl for lifting said pawl out of its holding position, a hand lever for operating said cam, and a retarder arranged for frictional engagement with a moving part of the winding mechanism, said retarder being pivotally associated with said cam but eccentric thereto, whereby movement of the cam to release the pawl moves the retarder bodily into frictional engagement with said moving parts of the winding mechanism.

6. In hand brakes for railway cars, the combination with winding mechanism operable in one direction to set the brakes, of mechanism for holding the winding mechanism in and releasing it from its brake setting position, comprising a ratchet operable with the winding mechanism, a holding pawl pivoted for engagement with said ratchet, a tripping cam member operable about an axis remote from the pivotal axis of said pawl and adapted in one position to bear down upon the pawl at a point near its pivotal axis and in another position to engage the end of the pawl to lift it out of its holding position, a hand lever for operating said cam, and a retarder pivoted on an axis eccentric to the axis of said cam member and adapted to be moved into retarding position by movement of said cam in a direction to release said holding pawl.

7. In combination with hand power mechanism for setting the brakes of railway cars and a housing for parts thereof, of means for holding the power mechanism in and releasing it from its brake setting position, comprising a ratchet operable with the power mechanism, a pivoted holding pawl enclosed within said housing and formed with a weighted end adapted to drop into holding engagement with said ratchet, means manually operable when the brakes are set to force the pawl from its holding position comprising a cam member pivoted within the said housing to engage the pawl at a point remote from its pivotal axis, a hand lever for operating said cam, and manually operable means independently of said lever for moving said pawl into and out of its holding position.

8. In combination with hand power mechanism for setting the brakes of railway cars, of means for holding the power mechanism in and releasing it from its brake setting position comprising a ratchet operable with the power mechanism, a holding pawl formed with a weighted end adapted to drop into holding engagement with said ratchet, means for releasing the pawl from its holding position comprising a cam member formed with trunnions journaled in a position whereby said cam is adapted to engage the end portion of the pawl to exert compound pressure thereon to force it out of holding position, and a retarder member pivoted on one of said trunnions on an axis eccentric to the pivotal axis of said cam, whereby movement of the cam in a direction to release said pawl forces the retarder into frictional engagement with said ratchet.

9. In combination with hand power mechanism for setting the brakes of a railway car, of means for holding the power mechanism in and releasing it from its brake setting position comprising a ratchet operable with the power mechanism, a pivoted holding pawl formed with a weighted end adapted to drop into holding engagement with said ratchet and at the other end with a tail adapted to engage the ratchet to limit the releasing movement of said pawl, means for releasing said pawl from its holding position comprising a cam member formed with a long arm adapted in one position of the cam to bear against the top of the pawl near its pivotal axis to keep the pawl in its holding position and with a short arm which in another position of the cam engages the end of the pawl to lift it out of its holding position, trunnions on said cam member, one of which is eccentric to the axis of rotation of said cam, a retarder shoe loosely pivoted on the eccentric portion of said trunnion and formed with a curved friction surface for bearing against said ratchet when the cam member is moved to a position to lift the said pawl out of its holding position.

10. In combination with hand power mechanism for setting the brakes of railway cars, of means for holding the power mechanism in and releasing it from its brake setting position comprising a ratchet operable with the power mechanism, a pivoted holding pawl for engagement with said ratchet to prevent reverse movement of said power mechanism, a cam member for moving said holding pawl out of engagement with said ratchet, a retarding member pivotally supported on an axis eccentric to the axis of said cam and adapted on movement of said cam into a position to release said pawl to exert pressure on said ratchet, and a lever for operating said cam and retarder arranged whereby the lever assumes a substantial vertical position when the retarder member is in frictional engagement with said ratchet.

11. In combination with hand power mechanism comprising winding mechanism, a housing in which said mechanism is enclosed and a vertically disposed hand wheel located outside the housing, of means for holding the power mechanism in and releasing it from its brake setting position comprising a pawl for engagement with a moving part of said winding mechanism, a cam for lifting the pawl out of its holding position, a lever located between said hand wheel and said housing for operating said cam, and a retarder pivotally supported on the cam shaft and adapted to be moved into and out of retarding position by the movement of said lever.

12. In hand brakes for railway cars, the combination with hand power mechanism operable in one direction to set the brakes, of means for holding the power mechanism from reverse movement comprising a ratchet movable with the power mechanism, a pawl pivoted to engage the ratchet, and releasing means comprising a tripping member for engagement with the pawl at a point remote from the pivotal axis of the pawl to exert multiplied power thereon, a trip operating shaft on which the tripping member is loosely mounted and having a lost motion connection with the tripping member, whereby the shaft may be moved through a greater arc than the tripping member.

13. In hand brakes for railway cars, the combination with hand power mechanism operable in one direction to set the brakes, of means for holding the power mechanism from reverse movement comprising a ratchet rotatable with the power mechanism, a pawl pivoted to engage the said ratchet, and pawl releasing means comprising a tripping cam member formed with a long arm for bearing against the pawl near its pivotal axis and a short arm for exerting pressure against the under surface of the pawl at a location remote from the pivotal axis of the pawl to lift it out of holding position, a trip operating shaft on which said cam is loosely mounted and having a lost motion connection therewith whereby the said shaft may be moved through a portion of its normal travel without imparting movement to said tripping cam.

14. In combination with hand power mechanism for setting the brakes of a railway car, of means for holding the power mechanism in and releasing it from its brake setting position comprising a pawl pivoted to engage a movable part of the power mechanism, a tripping cam, a shaft on which said tripping cam is loosely mounted, a hand lever for imparting movement to said shaft, there being a lost motion connection between said shaft and tripping member whereby movement of the shaft a predetermined distance imparts movement to the said cam, and a retarding member for frictional engagement with a moving part of the power mechanism operable to retard reverse movement of said power mechanism upon disengagement of said pawl from its holding position.

15. In hand brakes for railway cars, the combination with hand power mechanism operable in one direction to set the brakes, of means for holding the power mechanism in and releasing it from its brake setting position, comprising a ratchet movable with the power mechanism, a pawl pivoted to engage said ratchet, a cam for lifting the pawl out of holding position and a trip shaft for operating the cam and on which the cam is loosely mounted, said cam having a recess therein and a shaft having a portion extending into the recess to provide a lost motion connection between the cam and shaft.

16. In hand brakes for railway cars, the combination with hand power mechanism operable in one direction to set the brakes, of means for holding the power mechanism in and releasing it from its brake setting position, comprising a ratchet member rotatable with the power mechanism, a pawl pivoted to engage the said ratchet, a cam member pivoted on an axis separate from the axis of said pawl for lifting the pawl out of holding position, a trip shaft for operating the cam and on which the cam is loosely pivoted, said cam having a recess therein and the shaft having a portion extending into the recess to provide a lost motion connection between the cam and shaft, and a retarder member on the trip shaft movable by the movement of the shaft in one direction, into frictional engagement with a moving part of the power mechanism.

17. In hand brakes for railway cars, the combination with hand power mechanism operable in one direction to set the brakes, of means for holding the power mechanism in and releasing it from its brake setting position, comprising a ratchet member operable with the power mechanism, a pawl pivoted to engage said ratchet member, a tripping cam member operable about an axis remote from the pivotal axis of said pawl for forcing said pawl out of its holding position, and means for operating said cam to disengage said pawl comprising a lever having a lost motion connection with said cam, for the purpose described.

18. In a hand brakes for railway cars, the combination with winding mechanism operable in one direction to set the brakes, of mechanism for holding the winding mechanism in and releasing it from its brake setting position, comprising a holding pawl and a cam, one of which is recessed to embrace a portion of the other, whereby in one position of the cam it exerts pressure on the pawl near its pivot to maintain it in its normal holding position and in another position exerts pressure near the end of the pawl to lift it out of its holding position, a trip shaft on which the cam is loosely supported, the cam being formed with abutments and the shaft having means movable between said abutment to provide a lost motion connection between the trip shaft and said cam whereby the trip shaft may have an arcuate movement greater than the movement of the cam.

19. In combination with hand power mechanism for setting the brakes of a railway car, of means for holding the power mechanism in and releasing it from its brake setting position comprising a ratchet operable with the power mechanism, a pawl formed with a lateral flange, a cam positioned beneath said flange whereby the end portion of said flange bears on said cam at a point coinciding with the vertical axis of the cam, a shaft on which the cam is loosely mounted, cooperating means on the shaft and the cam for providing a lost motion connection between them.

20. The combination with hand power mechanism for setting the brakes of railway cars, of means for holding the power mechanism in and releasing it from its brake setting position, comprising a ratchet operable with the power mechanism, a pivoted holding pawl formed with a weighted end adapted to drop into holding engagement with said ratchet, a cam pivotally supported on an axis remote from the axis of said pawl and formed with a bearing surface of increasing radius for engagement with the pawl to force it out of engagement with said ratchet, and means for operating said cam having lost motion connection therewith.

21. In combination with hand power mechanism for setting the brakes of railway cars, of means for holding the power mechanism in and releasing it from its brake setting position, comprising a ratchet operable with the power mechanism, a pivoted holding pawl for engagement with the ratchet, means for releasing the pawl from its holding position comprising a cam pivoted on an axis different from said pawl and adapted to engage the ends thereof to lift it out of holding position and to support it in such position, a shaft on which the cam is loosely supported, a lever for operating said shaft, a retarder movable into frictional engagement with a moving part of the power mechanism by movement of said lever in a direction to move the pawl out of its holding position, the said cam having a recess and a shaft being provided with means extending into said recess to provide a lost motion connection between the shaft and cam, whereby said lever may be operated to interrupt the retarding pressure of the retarding element without effecting reengagement of the pawl with the ratchet.

22. In combination with hand power mechanism for setting the brakes of railway cars, of means for holding the power mechanism in and releasing it from its brake setting position, comprising a ratchet operable with the power mechanism, a pivoted holding pawl for engagement with the ratchet, a cam formed with a bearing surface of increasing radius for engagement with the pawl to force it out of engagement with the ratchet, a shaft on which the cam is loosely supported, a lever on said shaft, a portion of said shaft being provided with an eccentric axis, a retarder pivotally supported on the eccentric portion of said shaft and movable into frictional engagement with a moving part of the power mechanism by movement of the shaft in a direction to release the pawl from its holding position, said cam having a recess and a shaft being provided with means extending into said recess for effecting a lost motion connection between the shaft and cam whereby the said lever and shaft may be operated to move the retarding mechanism out of its engagement with the power mechanism without causing reengagement of the pawl with the ratchet until the said lever has moved a predetermined distance.

23. In combination with hand power mechanism for setting the brakes of a railway car, of means for holding the power mechanism in and releasing it from its brake setting position comprising a pawl formed with a portion for engaging with a movable part of the power mechanism to prevent reverse movement thereof and provided with a portion for frictional engagement with a moving part of the power mechanism to retard reverse movement thereof, a tripping cam formed with a bearing surface of increasing radius for disengaging said holding pawl from its holding position and for forcing said retarding portion of the pawl into its frictional engagement with said power mechanism.

24. In combination with hand power mechanism for setting the brakes of a railway car, of means for holding the said mechanism in and releasing it from its brake setting position comprising a ratchet wheel movable with the power mechanism, a pawl pivoted on an axis fixed with relation to the car and adapted to engage the ratchet wheel to hold it against reverse movement when the brakes are in set position, a rocking member for imparting movement to the pawl to release it from its holding position, and a hand lever mechanism having a lost motion connection with said rocking member for imparting movement thereto.

RICHARD W. BURNETT.